Patented Apr. 30, 1940

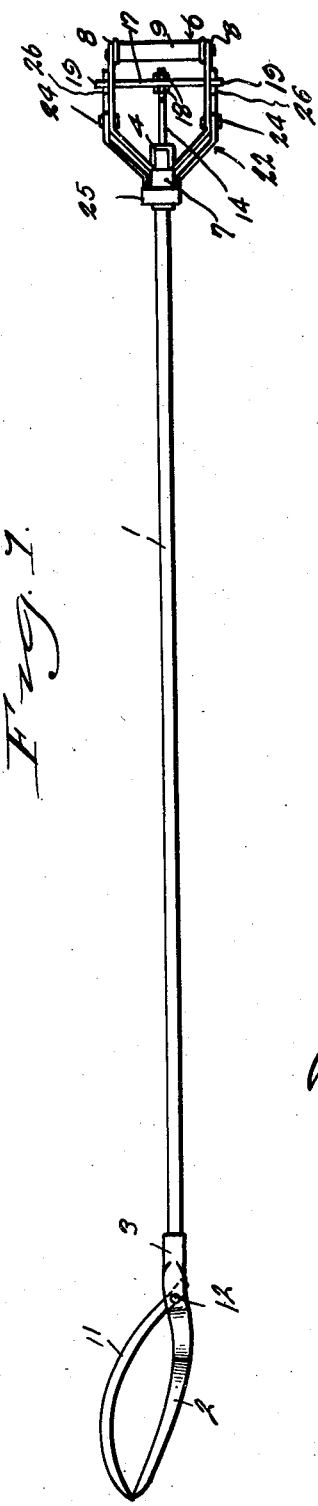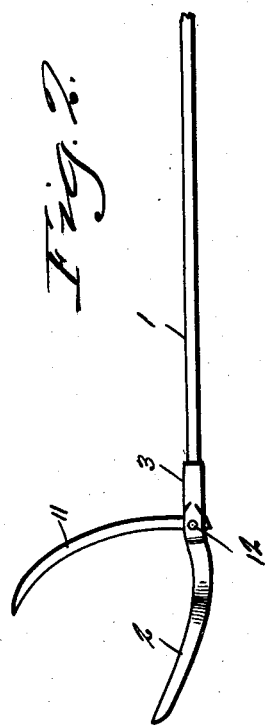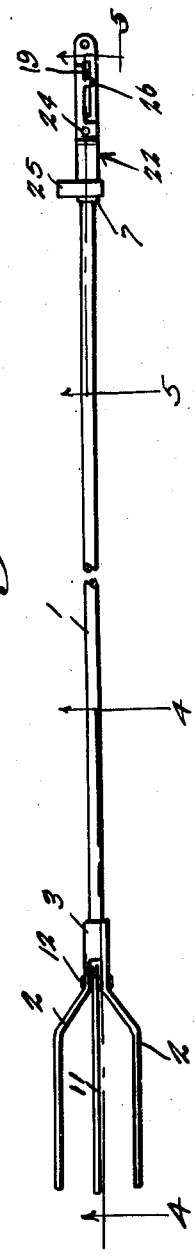

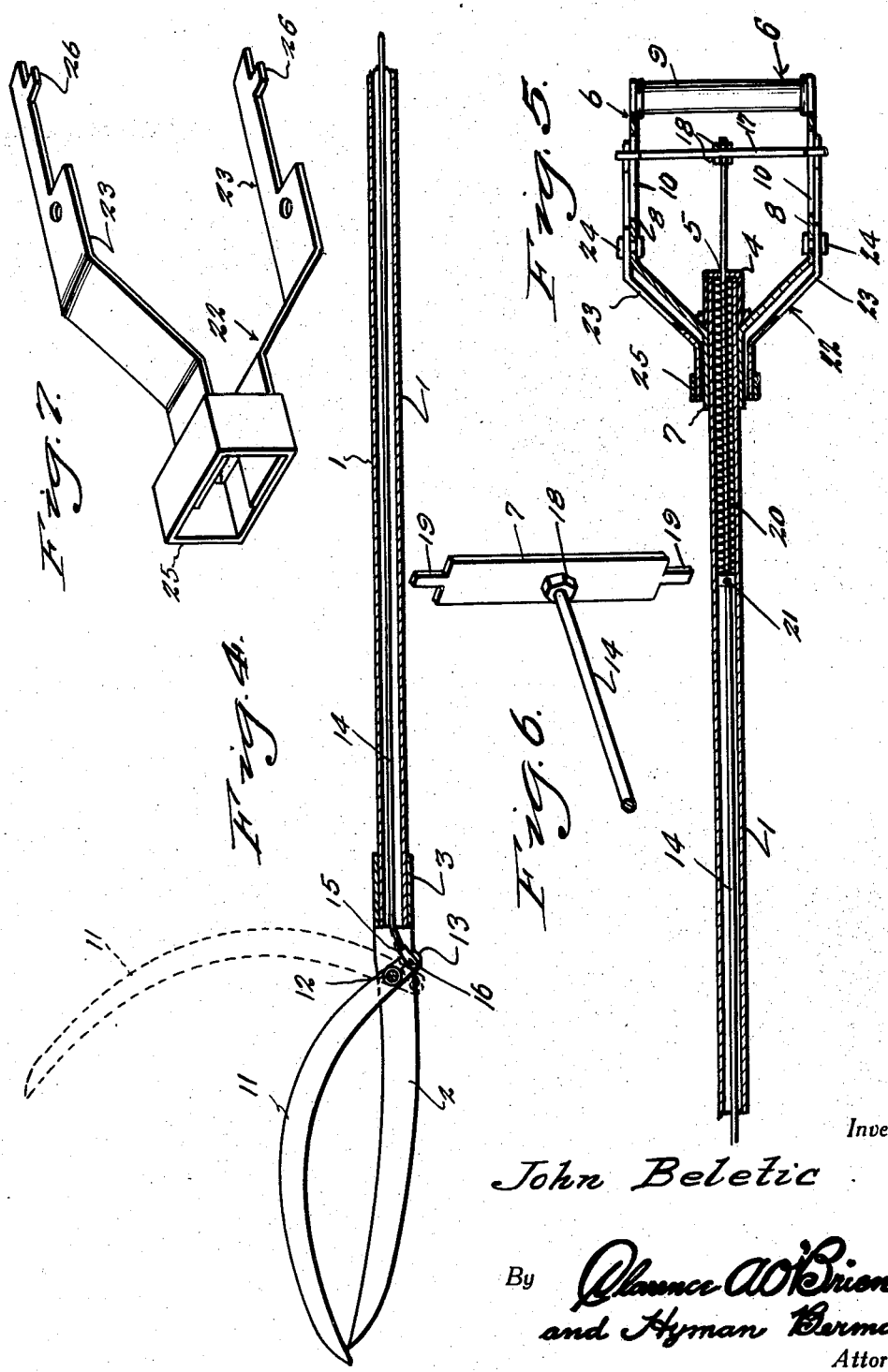

2,199,300

UNITED STATES PATENT OFFICE 2,199,300

TONGS

John Beletic, Cleveland, Ohio

Application August 10, 1939, Serial No. 289,480

2 Claims. (Cl. 294—11)

My invention relates to improvements in tongs for use more particularly in removing clinkers from furnaces although as will presently appear it may be used in various other capacities to equal advantage.

The primary object of the invention is to provide a device of the character indicated which is easy to manipulate, adapted for gripping cinders and clinkers securely, and for removing the same from the grate bars, and inexpensive to manufacture.

To the accomplishment of the above, and subordinate objects presently appearing, a preferred embodiment of my invention has been illustrated in the accompanying drawings, set forth in detail in the succeeding description, and defined in the claims appended hereto.

In said drawings:

Figure 1 is a view in side elevation of the preferred embodiment of the invention, Figure 2 is a fragmentary similar view illustrating operation of the pivoted tine, Figure 3 is a view in top plan, Figure 4 is a view in longitudinal section taken on the line 4—4 of Figure 1 looking in the direction indicated by the arrows and drawn to an enlarged scale, Figure 5 is a similar view taken on the line 5—5 of Figure 3 looking in the direction indicated by the arrows, Figure 6 is a view in perspective of the operating bar and rod, and Figure 7 is a view in perspective of the latch member.

Referring to the drawings by numerals, the tongs of my invention, as illustrated, comprise a hollow, preferably tubular shank, 1 of any suitable metal provided with a front end fork comprising a pair of preferably flat tines 2 extending from a sleeve 3 fitted over and suitably secured to said end of the shank 1. The tines 2 are longitudinally curved in the usual manner and are preferably arranged with flat sides opposed so as to facilitate their insertion into the grate sections, not shown. The rear end of the shank 1 is closed by a cylindrical cap 4 suitably secured thereto and having a central aperture 5 in the rear end thereof for a purpose presently seen. Extending from said rear end of the shank 1 is a yoke-like handle 6 including a front ferrule end 7 sleeved onto said shank 1 in advance of the cap 4 and fixed in any desired manner to said shank, a pair of side bars 8 extending rearwardly from the ferrule end 7 upon opposite sides of the axis of the shank 1, respectively, and a cross bar 9 connecting the rear ends of said side bars and providing a handgrip on said handle. The side bars 8 are longitudinally slotted as at 10, for a purpose to be explained.

A single tine 11 is pivotally mounted adjacent the rear end thereof on the tines 2 intermediate the same, as at 12, for swinging movement toward and from the same in the axis of the shank 1, said pivoted tine being longitudinally curved reversely relative to the direction of curvature of the tines 2. The rear end of the tine 11, beyond the pivot 12 forms a short crank arm 13 for operating said tine toward and from the tines 2.

For operating said crank arm 13, a flexible rod 14 is extended through the shank 1 for endwise movement with its front end operatively connected to said crank arm 13 through the medium of a suitable coupling link 15 and a pivot pin 16 extending through said link and arm. The rod 14 is slidably extended through the before-mentioned cap 4 by way of the aperture 5 therein and secured at its rear end to an operating cross-bar 17 in the handle 6 slidably mounted at its opposite ends in the before-mentioned slots 10 of the handle side bars 9. For securing said rod 14 to the operating bar 17, said rod is extended through said bar and has a pair of jam nuts 18 threaded thereon upon opposite sides of the bar respectively.

The ends of the operating bar 17 are preferably reduced, as at 19, to fit in the slots 10 and provide against endwise play of said bar between the side bars 8. A coil spring 20 is sleeved onto the rod 14 in the shank 1 between the cap 4 and a set collar 21 on the rod and urges the latter forwardly, the described connection of the rod 14 to the crank arm 13 being such that forward movement of said rod swings the pivoted tine 11 away from the tines 2 into normal open position. The ends 19 of the operating bar 17 coact with the forward ends of the slots 10 to establish the forward limit of movement of said rod 14 and the normal position of said tine 11. As will be obvious, by pulling the operating bar 17 rearwardly in the handle 6, pull may be exerted on the rod 14 to swing the tine 11 toward the tines 2 to clamp a clinker, or other object, between the single tine and the pair of tines.

A latch member 22 is provided on the handle 6 for retaining the operating bar 17 in a rearward position in which the pivoted tine 11 is swung into proximity to the tines 2. The latch member 22 comprises a pair of side latch arms 23 pivoted intermediate their ends, as at 24, on the side bars 8, in front of the slots 10, for swinging movement alongside the bars 8 and having front ends connected by a rectangular yoke 25 surrounding the ferrule end 7 of the handle 6 and elongated to permit swinging movement of said bars 23 into and from latching position. The rear ends of the latch arms 23 are provided with edge lugs 26 adapted in the latching position of said arms to itercept forward movement of the operating bar 17 and thereby latch the same in rearward position. The yoke 25 is designed to serve as a counterweight for the described latch member 22 constructed and arranged so that when the tongs are turned with one tine 2 uppermost and the tine 11 closed said yoke will counter-balance the latch member into unlatching position. Obviously said member 22 may be manually swung into and from latching position as desired.

The operation and use of the described invention will be readily understood from the foregoing. Suffice it to explain that by grasping the shank 1 with one hand and the handle 6 with the other, the tines 2 may be manipulated under the article to be picked up and by pulling the operating bar 17 rearwardly in the slots 10 of the handle side bars 8 the pivoted tine 11 may be adjusted for coaction with the tines 2 to clamp the article therebetween. Upon release of said bar 17, the tine 11 will be swung to releasing, or open position under the action of the spring 20 in a manner which will be understood. When desired tine 11 may be swung towards the tines 2 into an out-of-the-way position by pulling the operating bar 17 rearwardly and then latched in such position by latching the said bar 17 against forward movement through the medium of the latch member 22 in the manner already described. As soon as the latch member 22 is moved to unlatching position the tine 11 will be swung to normal, open position by the action of the spring 20.

The foregoing will, it is believed, suffice to impart a clear understanding of my invention without further explanation.

Manifestly the invention, as described, is susceptible of modification without departing from the inventive concept and right is herein reserved to such modifications as fall within the scope of the subjoined claims.

What I claim is:

1. In a device of the class described, a tubular shank, a fork fixed to and extending forwardly of one end of the shank, a single tine pivoted to the fork adjacent the rear end thereof for swinging movement toward and from the fork respectively, and means to swing said tine comprising an operating cross-bar at the opposite end of the shank slidably mounted at its ends for movement longitudinally of the shank, a crank arm on said tine, and a rod of flexible metal extending through the shank for endwise movement therein and having its opposite ends connected to said operating bar and crank arm respectively, said shank having a spring concealed therein and tensioning the rod against movement in one direction, and a latch member pivotally mounted at said opposite end of the shank for swinging movement into and out of latching relation to said bar, said member being counter-weighted for movement into unlatching relation when said shank is held substantially horizontally and turned to position one edge of the fork uppermost.

2. In a device of the class described, a tubular shank, a fork fixed to and extending forwardly of one end of the shank, a single tine pivoted to the fork adjacent the rear end thereof for swinging movement toward and from the fork respectively, and means to swing said tine comprising an operating cross-bar at the opposite end of the shank slidably mounted at its ends for movement longitudinally of the shank, a crank-arm on said tine, and a rod of flexible metal extending through the shank for endwise movement therein and having its opposite ends connected to said operating bar and crank-arm respectively, said shank having a spring concealed therein and tensioning the rod against movement in one direction, and a latch member pivotally mounted at said opposite end of the shank for swinging movement into and out of latching relation to said bar, said member being counter-weighted for movement into unlatching relation when said shank is held in a selected position.

JOHN BELETIC.